3,058,939
AQUEOUS POLYMERIZATION OF VINYLIDENE CHLORIDE AND UNSATURATED MONOMER USING SULFATE AND SULFONATE SALT EMULSIFIERS

John Warren Meier, Madison, Tenn., assignor to E. I. du Pont de Nemours and Company, Wilmington, Del., a corporation of Delaware
No Drawing. Filed Oct. 10, 1958, Ser. No. 766,379
7 Claims. (Cl. 260—29.6)

This invention relates to polymeric coating compositions and particularly to the preparation of coating compositions used to improve the properties of packaging materials.

The necessity of coating regenerated cellulose film, polyethylene terephthalate film, paper and the like to convert them into commercially acceptable packaging materials is well known. The coating can make the material capable of adhering to itself by the application of heat, termed "heat sealing" by the art, so that the conversion to bags, containers, etc., is facilitated. The coatings can provide moisture-proofness, a property usually lacking in the base material. The coatings can impart printability to a surface that otherwise might display little ability to retaining printing inks. The coatings can serve to improve the slip and matting properties of the base material, both properties indicating the ability of the surfaces to slide over each other for easy handling in a wrapping machine.

One of the most useful group of compositions which fulfills the above requirements are the vinylidene chloride copolymers. However, the application of vinylidene chloride copolymers in the form of aqueous dispersions to a running film has met with difficulties. When applying aqueous dispersions of vinylidene chloride copolymers, such as those dispersions described in U.S. Patent 2,570,478 to Pitzl, to polymeric film and particularly to regenerated cellulose film, the conventional doctor roll technique for smoothing has not been entirely successful. The resulting coated regenerated cellulose film displays a striation level unacceptable to the trade. However, when the concentration of the stabilizing agent used in the preparation of the dispersion is increased, the triation level can be reduced to an acceptable degree, but the resulting film durability, as measured by a stress-flex test, is below the acceptable trade level.

The primary object of the present invention is to provide aqueous dispersions of vinylidene chloride copolymers that will provide both satisfactory smoothing during coating and a coated film having acceptable durability. Another object is to provide dispersions with sufficient useful "life" prior to spontaneous coagulation so that they may be stored for a reasonable time before being used. (The useful "life" should generally be a minimum of 15 days.) A further object is to provide aqueous dispersions of vinylidene chloride copolymers that are particularly useful for coating regenerated cellulose film. Other objects will appear hereinafter.

The objects are accomplished by a critical process for preparing the aqueous dispersions. Thus, in the process for preparing an aqueous dispersion of a copolymer obtained from 80–97% vinylidene chloride copolymerized with at least one other polymerizable mono-olefinic monomer, the improvement of the present invention comprises incorporating into the aqueous dispersion prior to polymerization 0.5 to 2.0% by weight, based on the weight of the copolymer, of at least one compound selected from the group consisting of alkali metal alkyl sulfates and ammonium alkyl sulfates, the alkyl radical therein having 8 to 18 carbon atoms; and incorporating subsequent to polymerization 0.5–2% by weight, based on the weight of copolymer, of at least one compound selected from the group consisting of alkali metal alkyl sulfates and ammonium alkyl sulfates, the alkyl radical therein having 8 to 18 carbon atoms and 0.5–3.0% by weight, based on the weight of copolymer, of at least one compound selected from the group consisting of the alkali metal alkyl aryl sulfonates and ammonium alkyl aryl sulfonates, the alkyl radical therein having 5 to 20 carbon atoms in the alkyl group, the total amount of said sulfates used prior and subsequent to polymerization being 1.5–3.0%.

The alkyl sulfates useful in the present invention include sodium lauryl sulfate, sodium cetyl sulfate, sodium dodecyl sulfate, sodium n-hexadecyl sulfate, sodium n-octadecyl sulfate, sodium octadecenyl sulfate, ammonium dodecyl sulfate, ammonium 3,10- diethyl dodecyl sulfate, ammonium octadecyl sulfate and the commercially available alkali metal sulfates such as "Duponol" WAQ[1] and "Duponol" ME[1].

The preferred alkyl aryl sulfonates useful in the present invention are the alkyl benzene sulfonates. Particular alkali metal and ammonium alkyl benzene sulfonates include propyl benzene sulfonate, sodium dodecyl toluene monosulfonate, sodium dodecyl benzene sulfonate and commercial products such as "Santomerse" 3[2] and "Sulframin" AB.

The preferred process involves incorporating prior to polymerization 0.5 to 2.0% by weight of sodium lauryl sulfate as the dispersing agent and, subsequent to polymerization, 1.0% by weight of sodium lauryl sulfate and 2.0% by weight of sodium dodecyl benzene sulfonate into the aqueous dispersion of the copolymer of vinylidene chloride.

The invention will be more clearly understood by referring to the descriptive material and the examples which follow. Unless otherwise stated, all parts and percentages given in the examples are by weight. The examples, although illustrating specific embodiments of the present invention, should not be considered limitative. In the examples, the number of parts of the dispersing and stabilizing agents are presented on a solids basis unless otherwise specified. Thus, "Duponol" WAQ is added as 30% by weight of an aqueous solution, 3.33 parts of the solution providing 1 part of solid "Duponol" WAQ; "Santomerse" 3 is added as 75% by weight of an aqueous paste, 1.33 parts of the paste providing 1 part of solid "Santomerse" 3.

EXAMPLE I

A coating composition was prepared by adding vinylidene chloride, methyl acrylate, itaconic acid, "Duponol" WAQ as a dispersing agent and water to a vessel fitted with a reflux condenser. After stirring this mixture to disperse the ingredients, a solution of ammonium persulfate, meta-sodium bisulfite and ferrous ammonium sulfate in water was added to catalyze the reaction. The mixture was refluxed maintaining the temperature between 32° C. and 36° C. as polymerization progressed. The mixture was stirred until refluxing ceased, thereby indicating the completion of copolymerization. Upon completion of the reaction, a solution of "Duponol" WAQ, "Daxad" 11,[3] "Santomerse" 3 in water was added to stabilize the copolymer against coagulation. Hydrogen peroxide and ethylene glycol were also added subsequent to polymerization. The resulting dispersion was cooled and discharged through a filter. The polymeric dispersion was composed of 39.5% solids and 21% ethylene glycol.

[1] Sodium lauryl sulfate.
[2] Sodium dodecyl benzene sulfonate.
[3] The sodium salt of the condensation product of naphthylene sulfonic acid and formaldehyde.

The ingredients used in the preparation are summarized below.

| | Parts |
|---|---|
| Dispersing agent—"Duponol" WAQ | 1 |
| Vinylidene chloride | 94 |
| Methyl acrylate | 6 |
| Itaconic acid | 1 |
| Catalyzing agent: | |
|    Ammonium persulfate 0.2 | |
|    Meta-sodium bisulfite 0.1 | |
|    Ferrous ammonium sulfate 0.0025 | 0.3 |
| Water | 98 |

Upon completion of the reaction:

| Stabilizing agent: | Parts |
|---|---|
|    "Duponol" WAQ 1.0 | |
|    "Daxad" 11 0.4 | |
|    "Santomerse" 3 2.0 | 3.4 |
| Hydrogen peroxide | 0.25 |
| Ethylene glycol | 56 |
| Water | 10.4 |

The dispersion was coated on a regenerated cellulose film approximately 0.0013 inch thick. The coating was applied by passing the film through a coating bath containing the dispersion. Excess dispersion was doctored from the film surface. The coated film was then dried and tested. It had a coating weight, as dried, of 5.82 grams per square meter, a stress-flex value of 51 and a striation level of 1. The dispersion had a useful "life" of 30 days after the date of preparation, at which time it coagulated.

The details of the methods for testing the films follow:

Coating weight is determined for cellulosic film by soaking the coated film in a hot solution of a sodium alkyl aryl sulfonate in acetic acid and stripping the coating from the film. The stripped coating in the form of a thin film is dried and weighed.

Stress-flex is a measure of the flexibility and durability of the film. A sample of film 4" x 7" is placed between two rubber-faced clamps 1" apart. One clamp is stationary, the other slides back and forth by gravity on two rods flexing the film as the whole assembly rotates, until the film sample breaks. The stress-flex value indicates the number of strokes of the movable clamp until the film sample breaks. For most applications, a film should have a stress-flex value of at least 20 to be acceptable in the trade.

Striation level is a comparative measure of the striae which appear as a series of parallel lines in the coating. Striations were projected onto a screen by means of a Sylvania C25/DC/5 concentrated arc lamp placed between film and screen. In this way, samples were graded by comparison, as follows.

| Grade: | Striation level |
|---|---|
| 1 | Minimum (best). |
| 2 | Good. |
| 3 | Borderline. |
| 4 | Unacceptable. |

Useful "life" is a measure of the time in which the dispersion does not coagulate and can be used as a coating composition. It is reported as the number of days until coagulation takes place.

EXAMPLES II–XIII

In these examples, aqueous dispersions containing a copolymer of 94 parts vinylidene chloride, 3 parts methyl acrylate, 3 parts acrylonitrile, 1 part methacrylic acid and 1 part allyl glycidyl ether were prepared in a manner similar to that described in Example I. The quantity of "Duponol" WAQ used as the sole dispersing agent and the quantity of "Duponol" WAQ used in the stabilizing agent along with 2 parts "Santomerse" 3 and 0.3 part "Daxad" 11 were varied.

The resulting dispersions were coated on regenerated cellulose film following the procedure described in Example I. The regenerated cellulose film had been pretreated to contain 0.45% of a guanidine-urea-formaldehyde resin obtained by the reaction of guanidine nitrate, urea and formaldehyde as described in Example I of U.S. Patent 2,533,557 to Chapman. In the following tables, the test results for films coated with dispersions prepared by the process of the present invention are compared to results for those prepared outside the scope of invention (total "Duponol" WAQ used not being from 1.5–3.0% based on weight of copolymer or less than 0.5% "Duponol" WAQ in stabilizing agent).

Table 1
EFFECT OF VARYING "DUPONOL" WAQ IN STABILIZING AGENT WHEN USING 0.5 PART "DUPONOL" WAQ AS DISPERSING AGENT

| Example | "Duponol" WAQ in Stabilizing Agent | Total "Duponol" WAQ | Coating Weight | Stress Flex | Striation Level | Useful "Life" |
|---|---|---|---|---|---|---|
| II | 2.0 | 2.5 | 6.56 | 21 | 2 | 33 |
| III | 1.5 | 2.0 | 5.11 | 26 | 2 | 24 |
| IV | 1.0 | 1.5 | 5.23 | 47 | 1 | 20 |
| Control | 0.5 | 1.0 | 5.17 | 9.6 | 3 | 19 |
| Control | 0 | 0.5 | 6.35 | 9 | 4 | 7 |

Table 2
EFFECT OF VARYING "DUPONOL" WAQ IN STABILIZING AGENT WHEN USING 1.0 PART "DUPONOL" WAQ AS DISPERSING AGENT

| Example | "Duponol" WAQ in Stabilizing Agent | Total "Duponol" WAQ | Coating Weight | Stress Flex | Striation Level | Useful "Life" |
|---|---|---|---|---|---|---|
| V | 2.0 | 3.0 | 6.41 | 21 | 2 | 27 |
| VI | 1.5 | 2.5 | 6.56 | 24 | 2 | 23 |
| VII | 1.0 | 2.0 | 6.53 | 40 | 1 | 20 |
| VIII | 0.5 | 1.5 | 6.78 | 31.5 | 3 | 14 |
| Control | 0 | 1.0 | 6.90 | 13 | 4 | 7 |

Table 3
EFFECT OF VARYING "DUPONOL" WAQ IN STABILIZING AGENT WHEN USING 0.5 PART "DUPONOL" WAQ AS DISPERSING AGENT

| Example | "Duponol" WAQ in Stabilizing Agent | Total "Duponol" WAQ | Coating Weight | Stress Flex | Striation Level | Useful "Life" |
|---|---|---|---|---|---|---|
| Control | 2.0 | 3.5 | 5.93 | 16 | 2 | 18 |
| IX | 1.5 | 3.0 | 6.02 | 20 | 2 | 14 |
| X | 1.0 | 2.5 | 6.14 | 33 | 1 | 12 |
| XI | 0.5 | 2.0 | 6.29 | 30 | 2 | 11 |
| Control | 0 | 1.5 | 6.17 | 31 | 4 | 6 |

Table 4
EFFECT OF VARYING "DUPONOL" WAQ IN STABILIZING AGENT WHEN USING 2.0 PART "DUPONOL" WAQ AS DISPERSING AGENT

| Example | "Duponol" WAQ in Stabilizing Agent | Total "Duponol" WAQ | Coating Weight | Stress Flex | Striation Level | Useful "Life" |
|---|---|---|---|---|---|---|
| Control | 2.0 | 4.0 | 5.90 | 16 | 1 | 14 |
| Control | 1.5 | 3.5 | 6.75 | 17 | 2 | 12 |
| XII | 1.0 | 3.0 | 6.26 | 28 | 1 | 12 |
| XIII | 0.5 | 2.5 | 6.26 | 25.5 | 2 | 11 |
| Control | 0 | 2.0 | 6.60 | 31 | 4 | 5 |

EXAMPLES XIV–XV

In these examples, aqueous dispersions containing a copolymer of 94 parts vinylidene chloride, 3 parts methyl acrylate, 3 parts acrylonitrile, 1 part methacrylic acid and 1 part allyl glycidyl ether were prepared in a manner similar to that described in Example I. One part of "Duponol" WAQ was used as the sole dispersing agent and 1 part of "Duponol" WAQ was used in the stabilizing agent along with 0.3 part "Daxad" 11. These quantities of "Duponol" WAQ are optimum for stress-flex as shown in previous examples. However, the amount of "Santomerse" 3 used in the stabilizing agent was varied as shown in Table 5. The control contained no "Santomerse" 3.

The resulting dispersions were coated on regenerated cellulose film following the procedure described in Example I. The regenerated cellulose film had been pretreated to contain 0.45% of a guanidine-urea-formaldehyde resin obtained by the reaction of guanidine nitrate, urea and formaldehyde as described in Example I of U.S. Patent 2,533,557 to Chapman. In Table 5, the test results for films coated with the dispersions of these examples are presented. It will be noted that the presence of the alkyl aryl sulfonate ("Santomerse" 3) provides a substantial improvement in the useful "life" of the dispersion and the striation level of the coated film.

*Table 5*

EFFECT OF VARYING "SANTOMERSE" 3 IN STABILIZING AGENT CONTAINING 1.0 PART "DUPONOL" WAQ WHEN USING 1.0 PART "DUPONOL" WAQ AS DISPERSING AGENT

| Example | "Santomerse" 3 in Stabilizing Agent | Coating Weight | Stress Flex | Striation Level | Useful "Life" |
|---|---|---|---|---|---|
| XIV | 1 | 6.27 | 59 | 2 | 18 |
| XV | 2 | 6.21 | 56 | 1 | 28 |
| Control | 0 | 6.31 | 57 | 3 | 11 |

In the examples, copolymers of vinylidene chloride with methyl acrylate, acrylonitrile, methacrylic acid, allyl glycidyl ether and itaconic acid were formed into dispersions. However, the invention is not limited to these. In order to obtain satisfactorily coated films, the copolymer in the aqueous dispersions should contain at least 80% vinylidene chloride, preferably at least 90% vinylidene chloride, with any of the following polymerizable mono-olefinic monomers: methyl, ethyl, isobutyl, butyl, octyl and 2-ethylhexyl acrylates and methacrylates; phenyl methacrylate, cyclohexylmethacrylate, p-cyclohexylphenyl methacrylate, methoxyethyl methacrylate, chloroethyl methacrylate, 2-nitro-2-phenyl propyl methacrylate and the corresponding esters of acrylic acid; methyl alpha-chloroacrylate, octyl alpha-chloroacrylate, methylisopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthylene, ethyl vinyl ether, N-vinyl phthalimide, N-vinyl succinimide, N-vinyl carbazole, isopropenyl acetate, methylene diethyl malonate, acrylamide, methacrylamide, or monoalkyl substitution products thereof, phenyl vinyl ketone, diethyl fumarate, diethyl maleate, methylene diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single "$CH_2=C<$" group. The most useful ones fall within the general formula

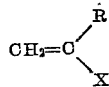

where R may be hydrogen, a halogen or a saturated aliphatic radical and X is selected from one of the following groups: —Cl, —Br, —F, —CN, —$C_6H_5$, —COOH, —COOR', —COR', —CHO, —$OC_6H_5$, —$CONH_2$, —CONH—R', and —$CONR'_2$, in which R' is alkyl. The preferred monomers are the alkyl acrylates such as methyl and ethyl acrylate, acrylonitrile, vinyl chloride, vinyl acetate, methacrylonitrile, ethyl methacrylate and methyl vinyl ketone.

The formation of the dispersions comprises emulsifying the monomers in an aqueous medium containing the critical quantity of one of the aforementioned dispersing agents. The aqueous medium may also contain other ingredients which do not detract from the success of this process nor limit the scope of the invention. Thus, a polymerization-promoting catalyst (initiator) such as ammonium persulfate, an activator for the catalyst such as sodium metabisulfate and an accelerator such as ferrous ammonium sulfate may also be added to the aqueous medium. When improved anchorage of the coating to a hydrophilic base sheet is desired, the polymerization charge may include an "acidic ethylenic compound," such as citraconic acid or citraconic anhydride, or mesaconic acid or a mixture of acid anhydrides, comprising citraconic anhydride and itaconic anhydride, obtainable from citric acid by distillation, and also itaconic acid and itaconic anhydride, and acrylic acid, methacrylic acid, and methyl methacrylic acid, in amounts of from 0.1% to 25% by weight of the total monomer charge. To prevent or inhibit the corrosion of metal surfaces, particularly chromium surfaces, when brought into contact with aqueous dispersions of the vinylidene chloride copolymers, hydrogen peroxide, .01% to 1.0% by weight, based on the total weight of the dispersion, may also be added to the dispersion.

The temperature is regulated to permit polymerization to take place. Polymerization may be conducted under visible reflux action or in an autoclave. After polymerization is substantially complete, the critical amount of the aforementioned stabilizing agent is added.

The coating compositions are applied in the form of the aqueous dispersions. They may be applied in accordance with any known coating techniques. They may be applied by passing the film through baths in a continuous manner or in a batch manner. The compositions may also be sprayed onto the film, or applied manually by brushing or the like. The thickness of the coatings may be adjusted in accordance with methods well known in the coating art.

Prior to coating, the base film may be treated with one or more known anchoring agents. For example, in the treatment of regenerated cellulose base film with the coating composition prepared in accordance with this invention, one or more synthetic thermosetting aldehyde resins may be used such as disclosed in U.S.P. 2,159,007, Charch et al.; U.S.P. 2,280,829, Jebens; U.S.P. 2,394,009, Pollard; U.S.P. 2,432,542, Pitzl; U.S.P. 2,523,869, Ellis; U.S.P. 2,533,557, Chapman; U.S.P. 2,546,575, Wooding, etc., in sufficient concentration to provide from 0.05% to 10% by weight of resin on the base films (dry basis). Other types of anchoring mediums which are equally applicable for use within the scope of the present invention are those described in U.S. Patents 2,284,896; 2,430,479; 2,768,909 and 2,794,116 and U.S. patent applications S.N. 652,376, filed April 12, 1957; 652,375, filed April 12, 1957; 520,135, filed July 5, 1955; and 480,800, filed February 12, 1955, and German Plastics Industry, 1946, pages 223–224.

The dispersions produced by the process of this invention can be applied smoothly as indicated by a low striation level and, once applied, exhibit excellent durability. The coated materials produced with the dispersions of this invention are used advantageously as packaging materials for foods, cigarettes and the like. They provide flexible, strong materials that, due to improved heat-seal strength, slip and matting, can be easily converted to packages. The coating does not detract from the transparency of the base material and surprisingly, provides excellent non-fogging characteristics. Because of these superior properties the present films are outstanding as a vacuum and pressure packaging material, e.g., for packaging of luncheon meats, cheese, nuts, etc.

As many widely different embodiments can be made without departing from the scope of my invention, it is understood that the invention is not limited except as defined in the appended claims.

What is claimed is:

1. A process for preparing a coating composition which comprises mixing in water vinylidene chloride and at least one other monomer having the formula

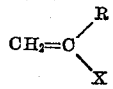

wherein

R is selected from the group consisting of hydrogen, halogen and a saturated aliphatic radical, and X is selected from the group consisting of —Cl, —Br, —F, —CN, —$C_6H_5$, —COOH, —COOR′, —COR′, —CHO, —$OC_6H_5$, —$CONH_2$, —CONH—R′, and —CONR′$_2$, wherein R′ is alkyl, in a ratio of 80–97 vinylidene chloride/3–20 of said other monomer with 0.5–2.0% by weight, based on the total weight of said vinylidene chloride and said other monomer, of at least one compound selected from the group consisting of alkali metal alkyl sulfates and ammonium alkyl sulfates, the alkyl radical therein having 8 to 18 carbon atoms; refluxing said vinylidene chloride and said other monomer to form a copolymer; and, thereafter, adding 0.5–2.0% by weight, based on the weight of said copolymer, of at least one compound selected from the group consisting of alkali metal alkyl sulfates and ammonium alkyl sulfates, the alkyl radical therein having 8 to 18 carbon atoms and 0.5–3.0% by weight, based on the weight of said copolymer, of at least one compound selected from the group consisting of alkali metal alkyl aryl sulfonates and ammonium alkyl aryl sulfonates, the alkyl radical therein having 5 to 20 carbon atoms, the total amount of said sulfates used prior and subsequent to forming the copolymer being 1.5–3.0% by weight based on the weight of said copolymer.

2. A process as in claim 1 wherein said alkali metal alkyl sulfate is sodium lauryl sulfate.

3. A process as in claim 1 wherein said alkali metal alkyl aryl sulfonate is an alkali metal alkyl benzene sulfonate.

4. A process as in claim 1 wherein said alkali metal alkyl aryl sulfonate is sodium dodecyl benzene sulfonate.

5. The process as in claim 1 wherein at least one of said other monomers is acrylonitrile.

6. The process as in claim 1 wherein at least one of said other monomers is methyl acrylate.

7. A process for preparing a coating composition which comprises mixing in water vinylidene chloride and at least one other monomer having the formula

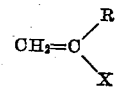

wherein

R is selected from the group consisting of hydrogen, halogen and a saturated aliphatic radical, and X is selected from the group consisting of —Cl, —Br, —F, —CN, —$C_6H_5$, —COOH, —COOR′, —COR′, —CHO, —$OC_6H_5$, —$CONH_2$, —CONH—R′, and —CONR′$_2$, wherein R′ is alkyl, in a ratio of 90–97 vinylidene chloride/3–10 of said other monomer with 0.5–2.0% by weight, based on the total weight of said vinylidene chloride and said other monomer, of at least one compound selected from the group consisting of alkali metal alkyl sulfates and ammonium alkyl sulfates, the alkyl radical therein having 8 to 18 carbon atoms; refluxing said vinylidene chloride and at least one other monomer to form a copolymer; and, thereafter adding 0.5–2.0% by weight, based on the weight of said copolymer, of at least one compound selected from the group consisting of alkali metal alkyl sulfates and ammonium alkyl sulfates, the alkyl radical therein having 8 to 18 carbon atoms and 0.5–3.0% by weight, based on the weight of said copolymer, of at least one compound selected from the group consisting of alkali metal alkyl aryl sulfonates and ammonium alkyl aryl sulfonates, the alkyl radical therein having 5 to 20 carbon atoms, the total amount of said sulfates used prior and subsequent to forming the copolymer being 1.5–3.0% by weight based on the weight of said copolymer.

References Cited in the file of this patent

UNITED STATES PATENTS

| | | |
|---|---|---|
| 2,570,478 | Pitzl | Oct. 9, 1951 |
| 2,771,457 | Barnes et al. | Nov. 20, 1956 |
| 2,819,984 | Ackerman | Jan. 14, 1958 |